(12) United States Patent
Helmy et al.

(10) Patent No.: US 12,529,919 B2
(45) Date of Patent: Jan. 20, 2026

(54) APPARATUS TO MANIPULATE GUIDED MODES ON A NANOSCALE USING ELECTRO-OPTIC EFFECTS

(71) Applicants: Amr Helmy, Thornhill (CA); Brian Cline, Austin, TX (US)

(72) Inventors: Amr Helmy, Thornhill (CA); Brian Cline, Austin, TX (US)

(73) Assignees: Amr Helmy, Thornhill (CA); Brian Cline, Austin, TX (US)

( * ) Notice: Subject to any disclaimer, the term of this patent is extended or adjusted under 35 U.S.C. 154(b) by 0 days.

(21) Appl. No.: 18/964,243

(22) Filed: Nov. 29, 2024

(65) Prior Publication Data

US 2025/0172833 A1 May 29, 2025

Related U.S. Application Data

(60) Provisional application No. 63/603,881, filed on Nov. 29, 2023.

(51) Int. Cl.
*G02F 1/035* (2006.01)
*G02F 1/01* (2006.01)
*G02F 1/025* (2006.01)

(52) U.S. Cl.
CPC ............ *G02F 1/035* (2013.01); *G02F 1/0121* (2013.01); *G02F 1/025* (2013.01);
(Continued)

(58) Field of Classification Search
CPC .... G02F 1/035; G02F 1/0121; G02F 2202/20; G02F 2203/10; G02F 2203/15; G02F 2203/50
See application file for complete search history.

(56) References Cited

U.S. PATENT DOCUMENTS 7,925,122 B2    4/2011  Diest et al.
8,116,600 B2 *  2/2012  Okamoto ............ G02B 6/1226
                                            385/39
(Continued)

FOREIGN PATENT DOCUMENTS

WO   WO-2005096088 A1 * 10/2005 ............. G02F 1/353
WO      2011/162719 A1   12/2011
WO      2023/041146 A1    3/2023

OTHER PUBLICATIONS

Es'haghi et al., "Design of a Hybrid Plasmonic Electro-Optical Modulator Based on n Doped Silicon and Barium Titanate", ArXiv: Applied Physics, 2018, 15 pages, found at https://doi.org/10.48550/arXiv.1808.07238. (Year: 2018).*

(Continued)

*Primary Examiner* — Daniel Petkovsek
(74) *Attorney, Agent, or Firm* — Conley Rose, P.C.

(57) ABSTRACT

An optical apparatus and device for integrated opto-electronic platforms to manipulate and control guided modes using electro-optic effects in an electromagnetic waveguide. The electromagnetic waveguide comprises a first semiconductor layer, an electro-optical material layer, a metal layer adjacent to the electro-optical material layer, and a second semiconductor layer. The optical apparatus is configured to transfer light in the electro-optical material layer, the electromagnetic waveguide is configured to create coupled plasmonic modes in the electro-optical material layer, and the electro-optical material layer is configured to modulate the light based on a voltage applied across a thickness of the electro-optical material layer.

20 Claims, 6 Drawing Sheets

(52) U.S. Cl.
CPC ...... *G02F 2202/20* (2013.01); *G02F 2203/10* (2013.01); *G02F 2203/15* (2013.01); *G02F 2203/50* (2013.01)

(56) References Cited

U.S. PATENT DOCUMENTS

| | | | |
|---|---|---|---|
| 8,238,702 B2 | 8/2012 | Flammer | |
| 8,909,002 B2 | 12/2014 | Takaoka et al. | |
| 8,983,251 B2 | 3/2015 | Lu et al. | |
| 9,417,469 B2 | 8/2016 | Abel et al. | |
| 9,494,715 B2 | 11/2016 | Lee et al. | |
| 9,823,498 B2 | 11/2017 | Whelan-Curtin et al. | |
| 10,274,757 B2 | 4/2019 | Fujikata et al. | |
| 11,009,658 B2 | 5/2021 | Jones et al. | |
| 11,693,180 B2 | 7/2023 | Bahadori et al. | |
| 11,693,290 B2 | 7/2023 | Makino et al. | |
| 2013/0039612 A1 | 2/2013 | Sugiyama et al. | |
| 2013/0315531 A1 | 11/2013 | Tamura et al. | |
| 2014/0056551 A1* | 2/2014 | Liu | G02F 1/025 977/734 |
| 2014/0061832 A1* | 3/2014 | Emboras | H10F 77/20 257/431 |
| 2016/0227639 A1* | 8/2016 | Kaminer | H05H 3/00 |
| 2022/0026634 A1* | 1/2022 | Bahadori | G02B 6/29338 |
| 2022/0334449 A1 | 10/2022 | Sacchetto et al. | |
| 2023/0007949 A1 | 1/2023 | Nishi | |
| 2023/0117534 A1 | 4/2023 | Schall et al. | |
| 2023/0168561 A1 | 6/2023 | Fainman et al. | |
| 2023/0350238 A1 | 11/2023 | Yuan et al. | |

OTHER PUBLICATIONS

Lin et al., "Dynamically reconfigurable nanoscale modulators utilizing coupled hybrid plasmonics", Scientific Reports, Mar. 2015.
Hoessbacher, "Plasmnic Sitches and Modulators for Optical Communications", ETH Zurich Series in Electromagnetic Fields, vol. 4, Diss.-No. ETH 24566, 2017.
Weigel et al., "Design of high-bandwidth, low-voltage and low-loss hybrid lithium niobate electro-optic modulators", Journal of Physics Photonics 3 (2021) 012001.
Zhang et al., "Plasmonic metafibers electro-optic modulators", Light: Science & Applications (2023) 12:198.
Chen et al., "Compact slow-light waveguide and modulator on thin film lithium niobate platform", DE Gruyter, Nanophotonics 2023.
Vazimali et al., "Applications of thin-film lithium niobate in nonlinear integrated photonics", Advanced Photonics, 2022, vol. 4(3), 034001.
Guo-Wei et al., "High-temperature-resistant silicon-polymer hybrid modulator operating at up to 200 Gbit s-1 for energy-efficient datacenters and harsh-environment applications", Nature Communications (2020) 11:4224.
Abbaszadeh-Azar et al., "Design of a low power silicon-plasmonic hybrid electro-optic modulator relied on ITO", Elsevier, Optical Materials 125 (2022) 112081.
Chatzitheocharis et al., "Efficient multi-step coupling between Si3N4 waveguides and CMOS plasmonic ferroelectric phase shifters in the O-band", Optics Express vol. 30, No. 15 (2022).
Ayata et al., "High-speed plasmonic modulator in a single metal layer", Science 358, 630-632 (2017).
Baeuerle et al., "Plasmonic-Organic Hybrid Modulators for Optical Interconnects beyond 100G", CLEO 2018, downloaded Aug. 10, 2020 from IEEE Xplore.
Baeuerle et al., "Reduced Equalization Needs of 100 GHz Bandwidth Plasmonic Modulators", Journal of Lightwave Technology, vol. 37, No. 9, May 1, 2019.
Su et al., "Record Purcell factors in ultracompact hybrid plasmonic ring resonators", Science Advances 2019, 5: eaav1790.
Su et al., "Highly sensitive wavelength-scale amorphous hybrid plasmonic detectors", Optica vol. 4, No. 10, Oct. 2017.
Koch et al., "A monolithic bipolar CMOS electronic-plasmonic high-speed transmitter", Nature Electronics, vol. 3, Jun. 2020, 338-345.
Thraskias et al., "Survey of Photonic and Plasmonic Interconnect Technologies for Intra-Datacenter and High-Performance Computing Communications", IEEE Communications Surveys & Tutorials, vol. 20, No. 4, Fourth Quarter 2018.
Koch et al., "Plasmonics—high-speed photonics for co-integration with electronics", Japanese Journal of Applied Physics 60, SB0806 (2021).
Dorodnyy et al., "Plasmonic Photodetectors", IEEE Journal of Selected Topics in Quantum Electronics, vol. 24, No. 6, Nov./Dec. 2018.
Emboras et al., "Electrically Controlled Plasmonic Switches and Modulators", IEEE Journal of Selected Topics in Quantum Electronics, vol. 21, No. 4, Jul./Aug. 2015.
Fedoryshyn et al., "Plasmonic Modulators", Asia Communications and Photonics Conference (ACP) 2015.
Haffner et al., "All-plasmonic Mach-Zehnder modulator enabling opktical high-speed communication at the Microscale", Nature Photonics, Published online: Jul. 27, 2015; DOI: 10.1038/nphoton. 2015.127.
Haffner et al., "Plasmonic Organic Hybrid Modulators—Scaling Highest Speed Photonics to the Microscale", Proceedings of the IEEE, vol. 104, No. 12, Dec. 2016, DOI: 10.1109/JPROC.2016. 2547990.
Heni et al., "108 Gbit/s Plasmonic Mach-Zehnder Modulator with > 70-GHz Electrical Bandwidth", Journal of Lightwave Technology, vol. 34, No. 2, Jan. 15, 2016.
Heni et al., "Plasmonic IQ modulators with attojoule per bit electrical energy consumption", Nature Communications; (2019) 10:1694; https://doi.org/10.1038/s41467-019-09724-7; www.nature.com/naturecommunications.
Hoessbacher et al., "Plasmonic modulator with >170 GHz bandwidth demonstrated at 100 GBd NRZ", Optics Express, vol. 25, No. 3, Feb. 6, 2017, Optice Express 1762.
Koch et al., "Digital Plasmonic Absorption Modulator Exploiting Epsilon-Near-Zero in Transparent Conducting Oxides", IEEE Photonics Journal, vol. 8, No. 1, Feb. 2016.
Lin et al., "Monolithic Plasmonic Waveguide Architecture for Passive and Active Optical Circuits", Nano Letters, American Chemical Society, Nano Lett. 2020, 20, 2950-2957.
Lin et al., "Supermode Hybridization: A Material-Independent Route toward Record Schottky Detection Sensitivity Using <0.05 μm3 Amorphous Absorber Volume", Nano Letters, American Chemical Society, Nano Lett. 2020, 20, 8500-8507.
Melikyan et al., "Surface plasmon polariton absorption modulator", Apr. 25, 2011, vol. 19, No. 9, Optics Express 8855.
Melikyan et al., "High-speed plasmonic phase modulators", Nature Photonics, Letters, Published online: Feb. 16, 2014; DOI: 10.1038/NPhoton.2014.9.
Messner et al., "Plasmonic Ferroelectric Modulators", Journal of Lightwave Technology, vol. 37, No. 2, Jan. 15, 2019.
Salamin et al., "100 GHz Plasmonic Photodetector", ACS Photonics 2018, 5, 3291-3297; DOI: 10.1021/acsphotonics. 8b00525.
Es'Haghi et al: "Design of a Plasmonic Absorption Electro-optical Modulator Based on n-doped Silicon and Barium Titanate", Arvix.org, Cornell University Library, 201 Olin Library Cornell University Ithaca, NY 14853, Aug. 22, 2018.
Charles et al: "Plasmonics: breaking the barriers of silicon photonics for high-performance chip-to-chip interconnects", 2020 IEEE International Electron Devices Meeting (IEDM), IEEE, Dec. 12, 2020.
Javed et al: "Electro-absorption plasmonic modulator in lithium niobate", 2017 IEEE Photonics Conference (IPC), IEEE, Oct. 1, 2017.
Montasir: "Terahertz Generation in Nonlinear Plasmonic Waveguides", IEEE Journal of Quantum Electronics, IEEE, USA, Apr. 1, 2016.
International Search Report and Written Opinion dated Apr. 11, 2025, for Application No. PCT/US2024/057985.

(56) References Cited

OTHER PUBLICATIONS

Zhang et al., "A power-efficient integrated lithium niobate electro-optic comb generator" (2022) https://arxiv.org/ftp/arxiv/papers/2208/2208.09603.pdf.

* cited by examiner

APPARATUS TO MANIPULATE GUIDED MODES ON A NANOSCALE USING ELECTRO-OPTIC EFFECTS

CROSS-REFERENCE TO RELATED APPLICATIONS

This application claims priority to and the benefits of U.S. Provisional Patent Application No. 63/603,881, filed on Nov. 29, 2023 and entitled Apparatus To Manipulate Guided Modes On A Nanoscale Using Electro-optic Effects, which is incorporated herein by reference in its entirety.

TECHNICAL FIELD

The systems and methods disclosed herein are directed to devices, systems, and methods for controlling and actuating localized/guided modes of electromagnetic fields on a nanoscale using electro-optic effects.

BACKGROUND

Surface plasmon polaritons (SPPs) are a type of localized electromagnetic waves that travel along an interface between a metal and a dielectric. Such waves result from the coupling between collective oscillations of free electrons in the metal and the optical electromagnetic dielectric modes.

SUMMARY

In accordance with at least an embodiment of this disclosure, an electromagnetic waveguide comprises a first set of layers including a first semiconductor layer and an electro-optical material layer, and a second set of layers including a metal layer and a second semiconductor layer. The electro-optical material layer is adjacent to the metal layer, the electromagnetic waveguide is configured to create coupled plasmonic modes in the electro-optical material layer, and the electro-optical material layer is configured to modulate light in the coupled plasmonic modes based on a voltage applied across a thickness of the electro-optical material layer.

In accordance with an embodiment of this disclosure, the first semiconductor layer is adjacent to the electro-optical material layer, and the second semiconductor layer is adjacent to the metal layer.

In accordance with an embodiment of this disclosure, the electro-optical material layer is configured to modulate a phase of the coupled plasmonic modes based on the voltage, where the phase is shifted by a first phase shift value in response to the voltage being a first voltage value, and the phase is shifted by a second phase shift value in response to the voltage being a second voltage value.

In accordance with an embodiment of this disclosure, a thickness of the electro-optical material layer is less than a thickness of each of the first semiconductor layer and the second semiconductor layer, and a ratio of a thickness of the metal layer to a wavelength of the light in the coupled plasmonic modes is less than 0.1.

In accordance with an embodiment of this disclosure, a thickness of the metal layer is less than the thickness of each of the first semiconductor layer and the second semiconductor layer.

In accordance with an embodiment of this disclosure, the respective thicknesses of the electro-optical material layer and the metal layer are less than a width of the electromagnetic waveguide.

In accordance with an embodiment of this disclosure, the respective thicknesses of the electro-optical material layer and the metal layer are on an order of tens of nanometers.

In accordance with an embodiment of this disclosure, the electro-optical material layer comprises a crystalline lattice configured to produce an electro-optical effect, wherein the electro-optical effect comprises changing a refractive index of the electro-optical material layer in response to a voltage applied across the thickness of the electro-optical material layer.

In accordance with an embodiment of this disclosure, the metal layer is configured to provide an electrical contact formed to apply a voltage across the thickness of the electro-optical material layer.

In accordance with an embodiment of this disclosure, the electromagnetic waveguide further comprises a second metal layer in contact with the first semiconductor layer, wherein the second metal layer is coupled to a second electrical contact configured to provide a voltage across the thickness of the electro-optical material layer.

In accordance with an embodiment of this disclosure, the electromagnetic waveguide is a coupled hybrid plasmonic waveguide (CHPW) configured to transfer light in the electro-optical material layer from a first end to a second end of the electromagnetic waveguide, wherein a length of the CHPW from the first end to the second end is on an order of tens or hundreds of micrometers.

In accordance with an embodiment of this disclosure, a refractive index of the first semiconductor layer is greater than a refractive index of the electro-optical material layer.

In accordance with an embodiment of this disclosure, the electromagnetic waveguide further comprises a third semiconductor layer on the second semiconductor layer, wherein a refractive index of the second semiconductor layer is less than a refractive index of the third semiconductor layer. The second set of layers may comprise the third semiconductor layer on the second semiconductor layer.

In accordance with an embodiment of this disclosure, the second set of layers comprises a second electro-optical material layer in contact with the metal layer, where the first electro-optical material layer and the second electro-optical material layer are in contact with the metal layer on respective sides and surfaces of the metal layer.

In accordance with an embodiment of this disclosure, the electro-optical material layer may comprise lithium niobate (LiNbO$_3$) or other electro-optical materials.

In accordance with an embodiment of this disclosure, at least one of the first semiconductor layer and the second semiconductor layer comprises silicon (Si).

In accordance with an embodiment of this disclosure, the width of the electromagnetic waveguide is on an order of tens or hundreds of nanometers.

In accordance with another embodiment of this disclosure, an optical apparatus comprises a substrate, a first semiconductor layer on the substrate, an electro-optical material layer on the first semiconductor layer, a metal layer on the electro-optical material layer, and a second semiconductor layer on the metal layer, wherein the optical apparatus is configured to concentrate light in the electro-optical material layer, and wherein the electro-optical material layer is configured to modulate the light based on a voltage applied across a thickness of the electro-optical material layer.

In accordance with an embodiment of this disclosure, the optical apparatus further comprises a second metal layer in contact with the first semiconductor layer, wherein the metal layer and the second metal layer are electrically contacted to apply a voltage differential across the thickness of the electro-optical material layer.

In accordance with an embodiment of this disclosure, the optical apparatus further comprises a resonant element optically coupled to the electro-optical material layer.

In accordance with an embodiment of this disclosure, the resonant element is a ring resonator that is adjacent to the electro-optical material layer.

In accordance with an embodiment of this disclosure, the resonant element is an optical cavity, wherein the electro-optical material layer is disposed within the optical cavity.

In accordance with an embodiment of this disclosure, the optical apparatus is a coupler coupled to a plurality of transceivers.

In accordance with yet another embodiment of this disclosure, a transceiver device comprises an electro-optical CHPW which comprises an electro-optical material layer, a semiconductor layer adjacent to a first surface of the electro-optical material layer, and a metal layer adjacent to a second surface of the electro-optical material layer, wherein the electro-optical CHPW is configured to concentrate light in the electro-optical material layer. The electro-optical CHPW is configured to create coupled plasmonic modes in the electro-optical material layer, and the electro-optical material layer is configured to modulate light in the coupled plasmonic modes based on a voltage applied across a thickness of the electro-optical material layer.

In accordance with an embodiment of this disclosure, a thickness of the electro-optical material layer is less than a width of the electro-optical CHPW.

In accordance with an embodiment of this disclosure, a thickness of the metal layer is less than a width of the electro-optical CHPW.

In accordance with an embodiment of this disclosure, the transceiver device further comprises a light source optically coupled to the electro-optical CHPW, wherein the electro-optical CHPW serves to modulate the light and contributes to the output of the transmitter.

In accordance with an embodiment of this disclosure, the transceiver device further comprises a photodetector.

In accordance with an embodiment of this disclosure, the transceiver device further comprises a control circuit coupled to the electro-optical CHPW, wherein the control circuit is configured to control a voltage applied across a thickness of the electro-optical material layer.

In accordance with an embodiment of this disclosure, the transceiver device further comprises a plurality of photodetectors, wherein the electro-optical CHPW is optically coupled to one or more optical paths that lead to corresponding photodetectors.

In accordance with an embodiment of this disclosure, the transceiver device further comprises a plurality of waveguides or optical fibers coupled to the electro-optical CHPW and respectively to the photodetectors.

In accordance with an embodiment of this disclosure, the transceiver device further comprises a plurality of light sources, wherein the electro-optical CHPW is optically coupled to one or more optical paths of the light sources.

In accordance with an embodiment of this disclosure, the transceiver device further comprises a plurality of waveguides or optical fibers coupled to the electro-optical CHPW and respectively to the light sources.

In accordance with an embodiment of this disclosure, the transceiver device further comprises a plurality of photodetectors and respective light sources, wherein the electro-optical CHPW is optically coupled to one or more optical paths of the photodetectors and the light sources.

In accordance with an embodiment of this disclosure, the transceiver device further comprises a plurality of waveguides or optical fibers coupled to the electro-optical CHPW and respectively to the photodetectors and respective light sources.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

It should be understood at the outset that, although an illustrative implementation of one or more embodiments are provided below, the disclosed systems, apparatuses and/or methods may be implemented using any number of techniques, whether currently known or in existence. The present disclosure should in no way be limited to the illustrative implementations, drawings, and techniques illustrated below, including the exemplary designs and implementations illustrated and described herein, but may be modified within the scope of the appended claims along with their full scope of equivalents.

SPPs have garnered significant attention because of the ability of such waves to be confined in sub-wavelength dimensions. Accordingly, SPPs may be useful for applications in miniaturized photonic devices, optical sensors, and data communications, such as on the nanometer scale. Various embodiments described herein leverage SPPs to enable improvements to communication device size, power consumption, data transmission rates, and the like.

Using SPPs to design optical devices in sub-wavelength dimensions, for example on the scale of nanometers, presents challenges including the inherent losses due to metals. SPP waves, also referred to as plasmonic modes, can suffer energy losses in a relatively short propagation length, such as below the one micrometer range. This can limit the application of SPPs in integrated photonic circuits. To address the limitations associated with the plasmonic modes, electromagnetic waveguides, referred to herein as coupled hybrid plasmonic waveguides (CHPWs), are presented to design miniature photonic devices, such as on a sub-micrometer or nanometer scale. The CHPWs described herein combine dielectric waveguides with metal-dielectric interfaces to achieve a balance between mode confinement and propagation loss of plasmonic modes. By configuring the material types, doping, refractive index of layers, and lateral (e.g., width) as well as vertical (e.g., height) dimensions of the CHPWs to support the confinement of plasmonic modes, the plasmonic mode losses can be reduced compared to other configurations to effectively and efficiently use the mode confinement properties of the SPPs in nanometer scale photonic devices.

Relative to other types of photonic circuits, such as photonic devices that are based on total internal reflection in silicon, CHPWs enable establishing plasmonic modes with higher mode confinement by including a metal layer into the waveguide structure. Providing a waveguide (e.g., a CHPW) that enables establishing and/or transferring plasmonic modes with higher mode confinement reduces the size requirement of the photonic device to match that of electronic components, which in turn provides better integration of photonics and electronics on a same platform (e.g., an integrated circuit, a chiplet, a group of chiplets). The reduced size requirement of the CHPW also allows increasing the packing density of CHPW-based devices, in comparison to other types photonic devices. This is useful for modern high-speed integrated electronic circuits, such as by increasing the packing density of transceivers for a multicore optical fiber on a single chip, or for employing coherent transceivers with high symbol rates for terabit per second (Tbps) communication links. Other advantages of using CHPW-based devices in integrated photonic and electronic circuits include enhanced bandwidth, improved athermal operation, and reduced power consumption.

In the examples and embodiments of this disclosure, an optical apparatus (e.g., a CHPW) is configured to create coupled plasmonic modes in an electro-optical material layer thereof. As explained above, the CHPW described herein enables plasmonic modes with higher mode confinement and lower optical losses. For example, when the CHPW is coupled to a light source, transverse antisymmetric and symmetric modes (i.e., coupled plasmonic modes) are formed therein. Some modes correspond to in-phase coupling of two HPW modes, resulting in stronger field intensity overlapping the metal and thus significant propagation loss. Conversely, other modes correspond to destructive interference of the two HPW modes, which lowers the Ohmic loss and enables extended propagation length.

According to various examples and embodiments of this disclosure, a CHPW is further configured to provide an electro-optic effect for manipulating the plasmonic modes and thus modulating the electromagnetic waves of light that propagate in the electro-optical CHPW, also referred to herein as guided waves. The CHPW comprises an electro-optical material, also referred to as an electro-optical CHPW, which can be controlled to manipulate the plasmonic modes and modulate the guided waves. The electro-optical material can be coupled to an adjustable voltage source, which may apply a voltage to the electro-optical material to change (e.g., based on the electro-optic effect) optical properties, such as the refractive index, of the electro-optical material. Accordingly, the optical properties of the electro-optical material can be changed by controlling the applied voltage, which enables manipulation of the coupled plasmonic modes in a certain manner. For example, the electro-optic effect produces a phase change of the coupled plasmonic modes (e.g., as a function of voltage bias), which may be used to implement a high-speed modulation scheme (e.g., phase modulation). In a more specific example, the coupled plasmonic modes are manipulated to modulate the waves propagating in the waveguide to perform certain functions of photonic devices. Such photonic devices can be integrated onto platforms that are compatible with conventional electronic technologies. For example, the electro-optical CHPW can be used in integrated photonic circuits and devices for modern high-speed integrated electronic circuits to overcome or alleviate challenges of interconnect density, latency, and power consumption.

In addition to the advantages of CHPWs, electro-optical CHPWs provide electro-optic effects that allow a level of control, such as by adjusting an applied voltage, to manipulate coupled plasmonic modes and hence in modulating the guided modes in photonic devices. This control can be useful to provide dynamic and adaptable photonic devices, such as transmitters, receivers, and interconnects for data communications. Interconnects in optical communications are components designed to handle the transmission of data using light, typically through fiber optic cables or waveguides. Such interconnects are useful in high-speed data networks (e.g., at gigabit or terabit rates), telecommunications, and data centers. Examples of interconnects for optical communications include optical fibers, optical waveguides, optical connectors, optical transceivers, optical amplifiers, optical switches, optical splitters and combiners, optical add-drop multiplexers, and other optical communications devices.

In some embodiments, using the symmetric mode as a signal carrier for the above-described modulation based on the electro-optic effect may reduce losses (e.g., insertion loss) in the CHPW. In one specific example, insertion loss may be reduced by manipulating the CHPW parameters such that electric field symmetry is established for the symmetric mode.

The design of the CHPW may enable enhanced or maximum overlap between the electromagnetic (EM) mode and the electro-optical material layer, thereby reducing the voltage required to obtain a certain amount of modulation of the EM field in this layer.

Figure 1:
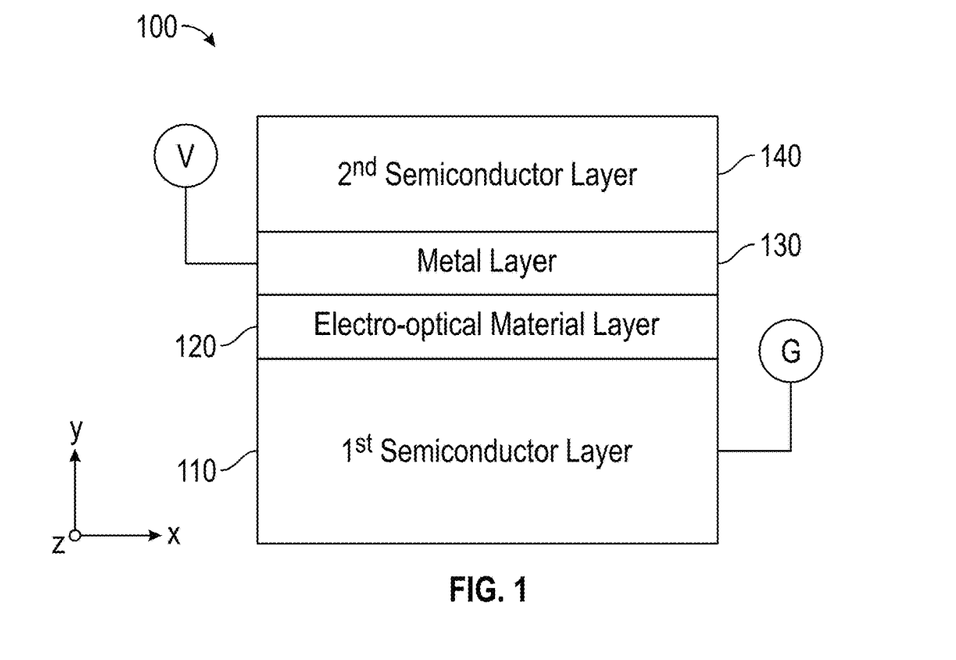
FIG. 1 illustrates an exemplary electro-optical CHPW according to some embodiments.

In at least some embodiments of this disclosure, an electro-optical material is disposed in a CHPW to enable or otherwise maximize the electro-optic effect, thereby reducing the electrical power or applied voltage required to modulate the light. The CHPW also comprises a semiconductor layer and a metal layer, both in contact with an electro-optical material layer. FIG. 1 illustrates a cross-section view of an exemplary electromagnetic waveguide 100 according to embodiments of this disclosure. The electromagnetic waveguide 100 is an electro-optical CHPW that comprises a first semiconductor layer 110 and an electro-optical material layer 120 disposed on the first semiconductor layer 110. The electromagnetic waveguide 100 also comprises a metal layer 130 on the electro-optical material layer 120, and a second semiconductor layer 140 on the metal layer 130. Both the first semiconductor layer 110 and the metal layer 130 are in contact with the electro-optical material layer 120 on respective sides and surfaces of the electro-optical material layer 120. In other embodiments, the metal layer 130 can be disposed between the electro-optical material layer 120 and the first semiconductor layer 110, and the second semiconductor layer 140 is disposed on top of the electro-optical material layer 120. This alternative arrangement of layers in comparison to that which is shown in FIG. 1 does not change the electro-optic effect or the electro-optical property of the electromagnetic waveguide 100 for manipulating and modulating the guided waves. The layers can be formed using semiconductor chip processing and fabrication technologies, such as complementary metal oxide semiconductor (CMOS), or other suitable fabrication processes for semiconductor devices.

In some embodiments, the electro-optical material of the electro-optical material layer 120 is a crystalline material configured to exhibit an electro-optic effect, such as by doping. Examples of such crystalline materials include semiconductor materials such as silicon, lithium niobate, indium phosphide, or other suitable materials. According to the electro-optic effect, the refractive index properties of the electro-optical material can change in a certain direction based on the amount of applied voltage by the first semiconductor layer 110 and the metal layer 130. For example, as shown in FIG. 1, the contact connected to the metal layer 130 can be used to apply a voltage (V) and the contact connected to the first semiconductor layer 110 can be used as a ground (G). In another example, the contacts can be reversed where the V contact can be connected to the first semiconductor layer 110 and the G contact can be connected to the metal layer 130. The electro-optical material can be configured such that the refractive index of the electro-optical material changes based on a change in the voltage applied across the thickness of the electro-optical material layer 120 (e.g., in a vertical or y-direction in FIG. 1). The molecules of the electro-optical material can be oriented, according to the fabrication process, in a direction that promotes change in the refractive index according to the direction of applied voltage (e.g., in the y-direction). As explained above, light passing through the electro-optical material may undergo a phase shift in response to the change in refractive index of the electro-optical material, thus enabling modulation based on the voltage applied across the thickness of the electro-optical material layer 120.

The electro-optic effect can be a linear electro-optic effect, also referred to as the Pockels effect, where an electric field that is applied (e.g., via an applied voltage) to the electro-optical material induces a linear change in the refractive index proportional to a strength of the electric field. The applied electric field induces dipole moments in the molecules of the electro-optical material that are aligned with the field. This realignment and induced polarization change the manner in which the electro-optical material interacts with light, which is reflected by a change in the refractive index value. In the absence of an electric field, the molecules return to their original, symmetric state, and the refractive index of the material index returns to an initial value. The strength of the electric field, which can be based on an amount of applied voltage, determines the change in the refractive index from the initial value. In some embodiments, the electro-optic effect can include a quadratic electro-optic effect, also referred to as the Kerr effect, where the refractive index changes in response to the change in the electrical field at a faster rate than the Pockels effect, and can match a higher response rate for high-speed interconnects, such as for Tbps communication links.

In some embodiments, the electro-optical material of the electro-optical material layer 120 can be a semiconductor material configured with quantum dots to produce the electro-optic effect. In other embodiments, the electro-optical material is a crystalline material that exhibits an electro-optic effect caused by a crystalline lattice in the arrangement of the material molecules. In other embodiments, the electro-optical material can be other materials, such as optical crystals, polymers, dielectrics, organic materials, nanocomposite materials, or metamaterials.

In the electromagnetic waveguide 100, the electro-optical material layer 120 and the metal layer 130 are configured to confine the plasmonic modes for the guided waves in the electromagnetic waveguide 100 along a length of the electromagnetic waveguide 100 (e.g., in the z direction). The electro-optical material layer 120 and the metal layer 130 form a core of the electromagnetic waveguide 100 within which the guided wave propagates. The first semiconductor layer 110 and the second semiconductor layer 140 effectively form claddings that contain the propagating guided waves in the direction of the thickness of the electromagnetic waveguide 100 (e.g., in the y direction). Accordingly, the refractive index of the electro-optical material layer 120 is less than the respective refractive indices of the first semiconductor layer 110 and the second semiconductor layer 140.

In some embodiments, the electromagnetic waveguide 100 is configured to promote the propagation of guided waves at a certain frequency or frequency range within the visible or near-infrared spectrum. The respective widths and thicknesses of the first semiconductor layer 110, the electro-optical material layer 120, the metal layer 130, and the second semiconductor layer 140 can be configured to allow the propagation of the guided waves within a certain frequency range, such as in the near-infrared range between 1.2 and 1.8 micrometers (m). The thicknesses of the layers can be set according to the frequency range. The widths of the layers can be the same or can be different. For example, the cross section of the electromagnetic waveguide 100 can be rectangular shape with a certain width across the layers. In another example, at least one of the two side walls at the cross section of the electromagnetic waveguide 100 can be tapered by varying the widths of the layers in the electromagnetic waveguide 100.

In an embodiment, as shown in FIG. 1, the thickness of the electro-optical material layer 120 is less than the respective thicknesses of the first semiconductor layer 110 and the second semiconductor layer 140. In some examples, a ratio of a thickness of the metal layer 130 to a wavelength of the light in the coupled plasmonic modes (e.g., in the electro-optic material layer 120) is less than about 0.1. That is, the wavelength of the light in the coupled plasmonic modes is at least ten times the thickness of the metal layer 130. The thickness of the metal layer 130 is also less than the respective thicknesses of the first semiconductor layer 110 and the second semiconductor layer 140. In some embodiments, the respective thicknesses of the electro-optical material layer 120 and the metal layer 130 are less than the width of the electromagnetic waveguide 100. For instance, the respective thicknesses of the electro-optical material layer 120 and the metal layer 130 can be on the order of tens of nanometers and the width of the electromagnetic waveguide 100 can be on the order of hundreds of nanometers. The thickness of the electro-optical material layer 120 can also be greater than the thickness of the metal layer 130. In the example shown in FIG. 1, the width of the electromagnetic waveguide 100 across the layers is greater than the respective thicknesses of the layers. In examples, the width of the electromagnetic waveguide 100 can be around 800 nanometers (nm) or less than 1 m, and the overall thickness of the electromagnetic waveguide 100 can be around few hundreds of nanometers. In an example, the respective thicknesses of the electro-optical material layer 120, the metal layer 130, the first semiconductor layer 110, and the second semiconductor layer 140 are around 20 nm, 10 nm, 200 nm, and 180 nm. In examples, the first semiconductor layer 110 and the second semiconductor layer 140 are both Si layers, the metal layer 130 is an aluminum (Al) layer, and the electro-optical material layer 120 is an electro-optic layer (bulk, interfacial, or stress-induced), which may include lithium niobate (LiNbO$_3$), crystalline Si, or a doped silicon oxide (SiO$_2$) layer.

In some embodiments, the metal layer 130 is connected to a contact configured to apply a voltage across the thickness direction (e.g., y-direction) of the electro-optical material layer 120. The electromagnetic waveguide 100 also includes a second metal layer (not shown in FIG. 1) connected to the first semiconductor layer 110, such as by a via or fin in the layers of the electro-optical material layer 120, and to a second contact to apply a voltage bias across the electro-optical material layer 120. In other embodiments, the electromagnetic waveguide 100 can include one contact (i.e., the metal layer 130), where the voltage can be biased at different ends.

In some embodiments, the electromagnetic waveguide 100 of FIG. 1 may be generalized as including a first set of layers that includes the first semiconductor layer 110 and the electro-optical material layer 120, and a second set of layers that includes the metal layer 130 and the second semiconductor layer 140. The electro-optical material layer 120 and the metal layer 130 are adjacent to one another. However, it may not necessarily be the case that the first semiconductor layer 110 is directly adjacent to the electro-optical material layer 120, nor that the metal layer 130 is directly adjacent to the second semiconductor layer 140. For example, there could be one or more intervening layers between the first semiconductor layer 110 and the electro-optical material layer 120, or between the metal layer 130 and the second semiconductor layer 140 without deviating from the scope of this disclosure.

Figure 2:
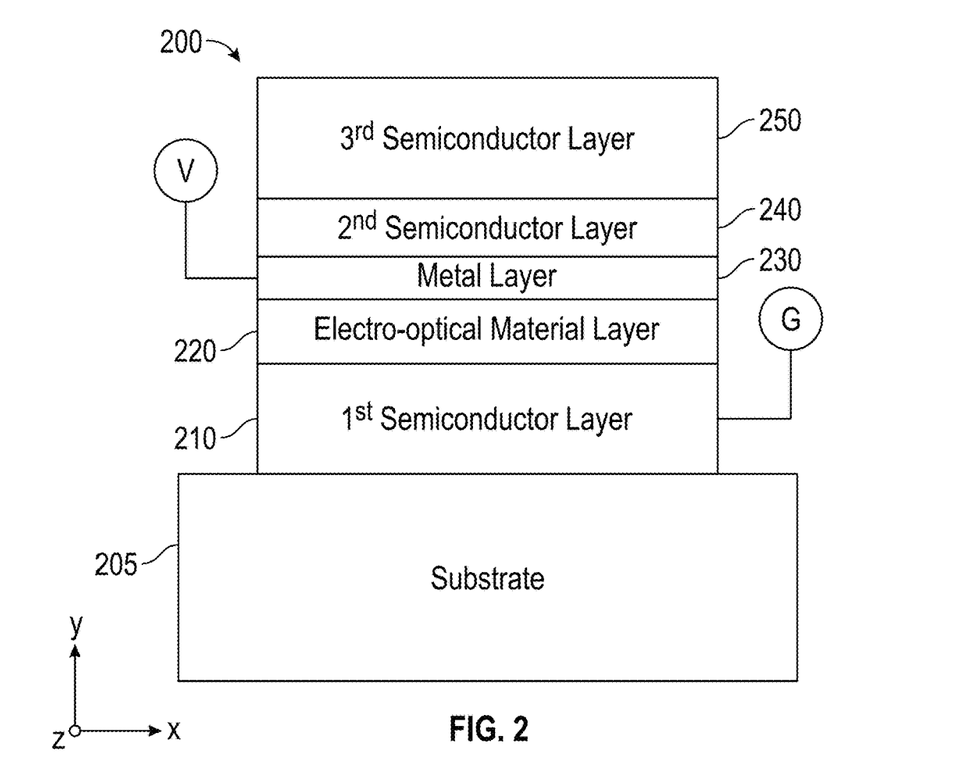
FIG. 2 illustrates another exemplary electro-optical CHPW according to some embodiments.

FIG. 2 illustrates a sectional view of an exemplary electromagnetic waveguide 200 according to embodiments of this disclosure. The electromagnetic waveguide 200 is an electro-optical CHPW that comprises a substrate 205, a first semiconductor layer 210 on the substrate 205, and an electro-optical material layer 220 disposed on the first semiconductor layer 210. The electromagnetic waveguide 200 further comprises a metal layer 230 on the electro-optical material layer 220, a second semiconductor layer 240 on the metal layer 230, and a third semiconductor layer 250. Both the electro-optical material layer 220 and the second semiconductor layer 240 are in contact with the metal layer 230 on respective sides and surfaces of the metal layer 230. The layers of the electromagnetic waveguide 200 can be formed using semiconductor chip processing and fabrication technologies, such as those used for CMOS.

In the electromagnetic waveguide 200, the first semiconductor layer 210 and the electro-optical material layer 220 can be configured similar to the first semiconductor layer 110 and the electro-optical material layer 120, respectively, of the electromagnetic waveguide 100. The third semiconductor layer 250 can also be configured similar to the second semiconductor layer 140. The electro-optical material layer 220, the metal layer 230, and the second semiconductor layer 240 form a core of the electromagnetic waveguide 200 within which the guided waves propagate along a length of the electromagnetic waveguide 200 (e.g., the z direction). The first semiconductor layer 210 and the third semiconductor layer 250 form the claddings that contain the propagating guided waves in the direction of the thickness of the electromagnetic waveguide 200 (e.g., the y-direction). Accordingly, the respective refractive indices of the electro-optical material layer 220 and the second semiconductor layer 240 are less than the respective refractive indices of the first semiconductor layer 210 and the third semiconductor layer 250. The substrate 205 can provide mechanical support to the other layers of the electromagnetic waveguide 200, and can also be used to bond the layers onto a circuit board for integrating photonic and electronic components into an opto-electronic platform. The substrate 205 can be composed of a suitable material for CMOS or other semiconductor chip processing and fabrication technologies. For example, the substrate 205 can be composed of Polycrystalline Si (poly-Si). A voltage can also be applied by respective contacts connected to the first semiconductor layer 210 and the metal layer 230. For example, as shown in FIG. 2, the contact connected to the metal layer 230 can be used to apply a voltage (V) and the contact connected to the first semiconductor layer 210 can be used as a ground (G). In another example, the contacts can be reversed where the V contact can be connected to the first semiconductor layer 210 and the G contact can be connected to the metal layer 230.

In other embodiments, an electromagnetic waveguide that is configured as an electro-optical CHPW comprises more than one electro-optical material layer in contact with a metal layer in the core of the electromagnetic waveguide. For example, a first electro-optical material layer and a second electro-optical material layer can be formed in contact with a metal layer on respective sides and surfaces of the metal layer. The first electro-optical material layer and second electro-optical material layer can comprise the same electro-optical material or different electro-optical materials. For example, the first electro-optical material layer can be configured to provide a Pockels effect and the second electro-optical material layer can be configured to provide a Kerr effect. Further, the first electro-optical material layer and second electro-optical material layer can be biased by the same applied voltage or can be biased by different voltages to control the respective electro-optic effects. In some examples, the electromagnetic waveguide can comprise two additional contact layers to provide, in combination with the metal layer respective voltages to the first electro-optical material and second electro-optical material.

Figure 3A:
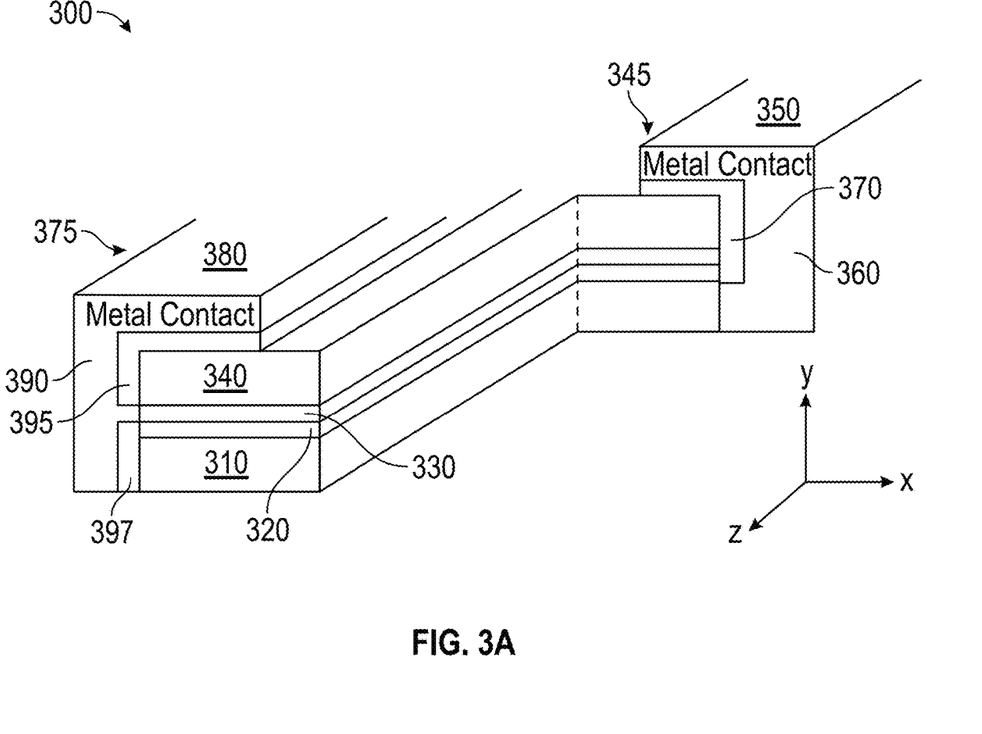
FIG. 3A illustrates another exemplary electro-optical CHPW according to some embodiments.
Figure 3B:
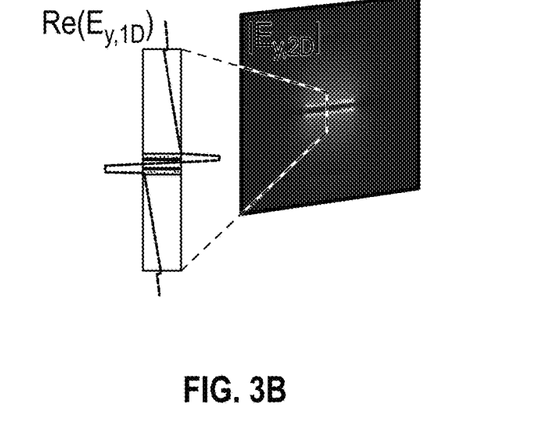
FIGS. 3B and 3C illustrate schematic field distributions of antisymmetric and symmetric modes in an electro-optical CHPW according to some embodiments.
Figure 3C:
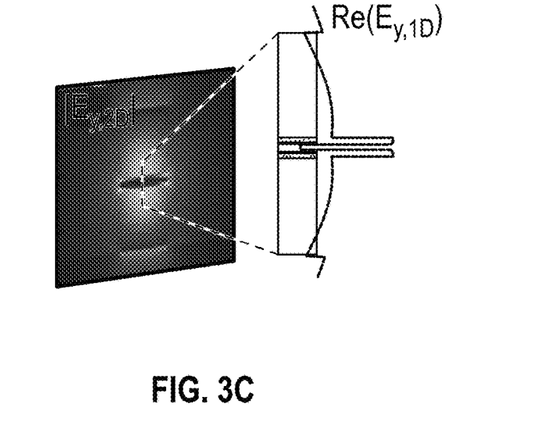

FIG. 3A illustrates a three-dimensional (3D) sectional view of an exemplary electromagnetic waveguide 300 according to embodiments of this disclosure. FIGS. 3B and 3C illustrate simulated field distributions for an antisymmetric mode and a symmetric mode, respectively, that are formed in the waveguide 300. The electromagnetic waveguide 300 is an electro-optical CHPW that comprises a first semiconductor layer 310 and an electro-optical material layer 320 disposed on the first semiconductor layer 310. The electromagnetic waveguide 300 also comprises a metal layer 330 on the electro-optical material layer 320, and a second semiconductor layer 340 on the metal layer 330. Both the first semiconductor layer 310 and the metal layer 330 are in contact with the electro-optical material layer 320 on respective sides and surfaces of the electro-optical material layer 320. The layers can be formed using semiconductor chip processing and fabrication technologies, such as CMOS or other suitable fabrication processes for semiconductor devices.

The layers of the electromagnetic waveguide 300 can be configured similar to the respective layers of the electromagnetic waveguide 100. The metal layer 330 is connected to a first contact configured to apply voltage across the thickness direction y of the electro-optical material layer 320. The electromagnetic waveguide 300 also includes a first metal contact 345 connected to the first semiconductor layer 310 and a second metal contact 375 connected to the metal layer 330. The first metal contact 345 and the second metal contact 375 can be composed of the same metal as the metal layer 330, and are configured as voltage and ground contacts to apply the voltage across the thickness of the electro-optical material layer 320.

In an embodiment, the first metal contact 345 can comprise a first part 350 that forms a metal layer above the layers of the electromagnetic waveguide 300. The first metal contact 345 also comprises a second part 360, which can be in the form of a fin as shown in FIG. 3A, embedded through the layers of the electromagnetic waveguide 300. The second part 360 is in contact with the first semiconductor layer 310, while the first metal contact 345 is insulated from the remaining layers of the electromagnetic waveguide 300. For example, the electromagnetic waveguide 300 can also comprise a fin 370 that is formed from an electric insulation material through the layers of the electromagnetic waveguide 300 to isolate the first part 350 and the second part 360 of the first metal contact 345 from the second semiconductor layer 340, the metal layer 330, and electro-optical material layer 320, as shown in FIG. 3A.

The second metal contact 375 also comprises a first part 380 above the layers of the electromagnetic waveguide 300, and a second part 390, which can be in the form of a fin, embedded through the layers of the electromagnetic waveguide 300. The second part 390 is in contact with the metal layer 330, while the second metal contact 375 is insulated from the remaining layers of the electromagnetic waveguide 300. For example, the electromagnetic waveguide 300 can also comprises a first fin 395 that is formed from an electric insulation material through the layers of the electromagnetic waveguide 300 to isolate the first part 380 and the second part 390 of the second metal contact 375 from the second semiconductor layer 340, and a second fin 397 of an electric insulation material to isolate the second part 390 from electro-optical material layer 320 and the first semiconductor layer 310, as shown in FIG. 3A.

The first metal contact 345 is a second contact configured to apply, in conjunction with the metal layer 330, a voltage across the thickness of the electro-optical material layer 320. For example, the metal layer 330 can be configured as a power supply contact, and the second metal layer (i.e., first part 350) of the first metal contact 345, which is in contact with the first semiconductor layer 310, can be configured as a ground contact. In some embodiments, the voltage can be varied in a range from a lowest value to a highest value to achieve a respective desired range of minimum refractive index to a maximum refractive index in the electro-optical material layer 320. In examples, the lowest voltage value is set to zero to obtain the initial refractive index value of the electro-optical material.

In the electromagnetic waveguides 100, 200, 300, the layers are such that the optical mode is preferentially located within the electro-optical material layer 120, 220, 320, which may serve to maximize the overlap between that mode and the electro-optical material layer 120, 220, 320, thereby reducing the voltage differential required to implement optical modulation (e.g., in the electro-optical material layer). Localizing the coupled modes within the electro-optical material layer 120, 220, 320 may reduce the insertion loss of devices that use any of the electromagnetic waveguides 100, 200, 300, and also reduce the switching energy. In the exemplary waveguide 300 in FIG. 3A, the optical mode overlap results in a higher portion of the mode intensity in the electro-optical material layer 320 compared to conventional, non-plasmonic modulators that use electro-optical materials.

In some embodiments, an electro-optical CHPW (e.g., any of the electromagnetic waveguides 100, 200, or 300) can be part of an optical apparatus in a photonic device, such as in combination with one or more light sources, photodetectors, resonant elements, optical waveguides, or combinations thereof. Such photonic devices can be integrated with electronic components on a same platform, such as a circuit board or a chip. Examples of such integrated opto-electronic platforms include interconnect chips or circuit boards that connect between electronic devices, such as switches, routers and servers, for example using optical fibers. The electro-optical CHPW can also be used to couple between any suitable devices, including interconnects, electronic devices, photonic devices, or integrated opto-electronic platforms in general. For example, a transceiver can be combined with a photonic device on a same layer of a platform stack or on different layers. The components in the same layer can also be optically coupled by the electro-optical CHPW, for example in combination with a non-electro-optical CHPW or other types of optical waveguides. In other embodiments, the photonic device comprising the electro-optical CHPW can be coupled to a separate device or platform via an optical fiber.

Figure 4:
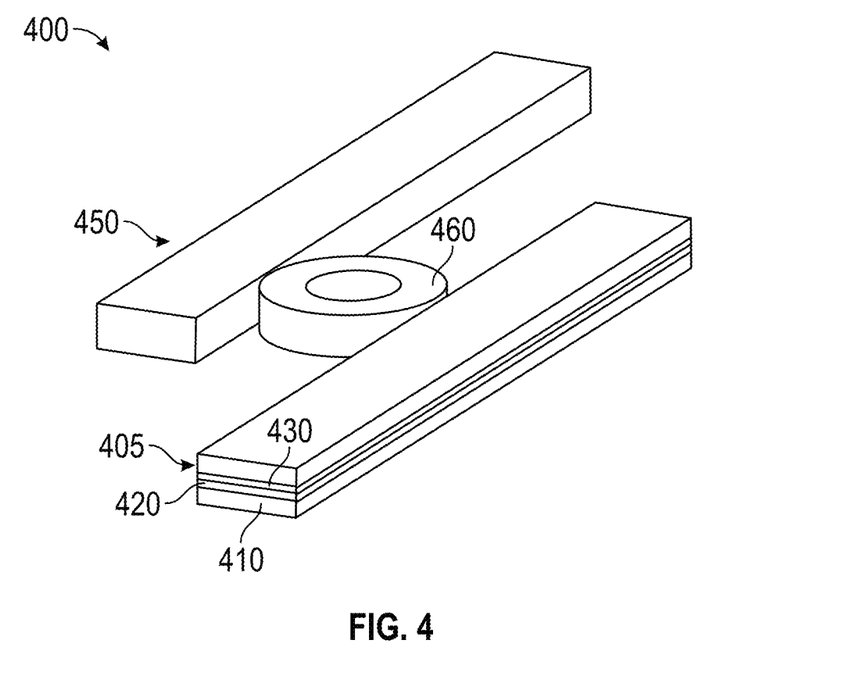
FIG. 4 illustrates an exemplary optical apparatus comprising an electro-optical CHPW according to some embodiments.

FIG. 4 illustrates an exemplary optical apparatus 400 comprising an electro-optical CHPW 405 according to some embodiments. The optical apparatus 400 can be part of a photonic device or an integrated opto-electronic platform comprising both photonic and electronic components. In examples, an integrated opto-electronic platform that comprises the optical apparatus 400 can be an interconnect for handling communications between electronic devices using optical fibers. The interconnect is configured to convert optical communication signals on the optical links to electrical data signals for processing by the electronic component. The optical communication signals can be optically modulated data signals at modern communication data rates, such in Tbps or on the order of tens of Tbps.

The electro-optical CHPW 405 comprises a first semiconductor layer 410, an electro-optical material layer 420 on the first semiconductor layer 210, a metal layer 430 on the electro-optical material layer 420, and a second semiconductor layer 440 on the metal layer 430. The layers of the electro-optical CHPW 405 can be configured similar to the respective layers of the electromagnetic waveguide 100. In other embodiments (not shown in FIG. 4), the electro-optical CHPW 405 can also include additional layers, such as the third semiconductor layer 250 of the second electromagnetic waveguide 200. The electro-optical CHPW 405 can also include a second contact layer other than the metal layer 430. In some embodiments, the electro-optical CHPW 405 can include a second electro-optical material layer in contact with the metal layer 430. Further, the layers of the electro-optical CHPW 405 can be supported by a substrate, such as the substrate 205 of the electromagnetic waveguide 300.

The optical apparatus 400 also comprises a second optical waveguide 450 that is optically coupled to the electro-optical CHPW 405 by a ring resonator 460. The second optical waveguide 450 can be any optical waveguide that comprises a core layer for guiding the propagation of light waves along the length of the second optical waveguide 450 (e.g., in the z direction), and two cladding layers on opposite sides and surfaces of the core layer for confining the guided waves in the directions orthogonal to the propagation direction (e.g., the x and y directions). The second optical waveguide 450 may not comprise a metal layer and may not support the confinement of plasmonic modes. In other embodiments, the second optical waveguide 450 can be a non-electro-optical CHPW that comprises a metal layer and is configured to support plasmonic modes confinement but does not include an electro-optical material.

The ring resonator 460 is a resonant element that functions as a loop shaped optical waveguide for a certain frequency or frequency range of light. The dimensions of the ring resonator 460 allow guiding optical waves at a certain frequency of frequency range on the loop-shaped optical path. By placing the electro-optical CHPW 405 and the second optical waveguide 450 at a distance that is sufficiently close to the ring resonator 460, light waves can be transferred between the electro-optical CHPW 405 and the second optical waveguide 450 through the ring resonator 460. The optical apparatus 400 is useful to transfer and redirect light waves between adjacent waveguides, such as between to an electro-optical waveguide from any other type of optical waveguide in order to manipulate or modulate the light waves at a certain frequency of frequency range.

Figure 5:
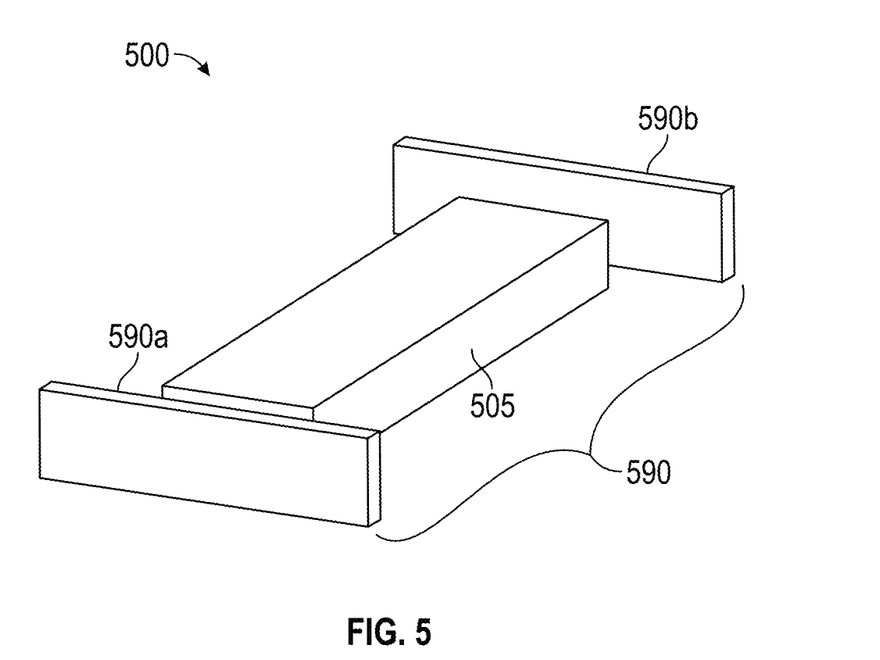
FIG. 5 illustrates another exemplary optical apparatus comprising an electro-optical CHPW according to some embodiments.

FIG. 5 illustrates another exemplary optical apparatus 500 comprising an electro-optical CHPW 505 according to some embodiments. The optical apparatus 500 can be part of a photonic device or an integrated opto-electronic platform that comprises both photonic and electronic components, such as a high-speed interconnect chip or circuit board. For example, the interconnect can be an opto-electronic switch for optical links at Tbps data rates. The electro-optical CHPW 505 is a CHPW waveguide that supports the confinement of plasmonic modes and that includes an electro-optical layer configured to manipulate the plasmonic modes and modulate guided waves. As described above, a voltage may be applied to the electro-optical layer to implement a phase shift of coupled plasmonic modes therein, which in turn enables a modulation scheme to be implemented. For example, the electro-optical layer may modulate a phase of the coupled plasmonic modes therein based on a voltage applied across a thickness of the electro-optical layer. The phase may be shifted by a first phase shift value in response to the voltage being a first voltage value, and shifted by a second phase shift value in response to the voltage being a second voltage value. The foregoing is an illustrative example, and the embodiments described herein are not necessarily limited to implementing only two phase shift amounts. In some embodiments, the electro-optical CHPW 505 is configured similar to any of the electromagnetic waveguides 100, 200, or 300.

The optical apparatus 500 further comprises an optical cavity 590 formed by two reflective layers 590a and 590b. The reflective layers 590a and 590b are oriented in parallel with respective surfaces facing the ends of the electro-optical CHPW 505, as shown in FIG. 5. The optical cavity is a resonant element configured to transmit certain frequencies or narrow frequency bands (e.g., narrow frequency ranges with sharp peaks) separated by equal frequency gaps. The transmitted frequencies or narrow frequency bands can correspond to optical communication channels. The respective surfaces of the reflective layers 590a and 590b are configured as optical reflectors for light coming out of the electro-optical CHPW 505. The light can be transmitted into the electro-optical CHPW 505 using other optical elements.

For example, the optical apparatus 500 can also comprise a ring resonator that is optically coupled to both the electro-optical CHPW 505 and a second waveguide, in a similar configuration of the optical apparatus 400. The reflective layers 590a and 590b can be configured, based on the chosen materials and thicknesses, to reflect and bounce a portion of this light between the two respective surfaces of reflective layers 590a and 590b, which are facing the electro-optical CHPW 505 on opposite ends. At the same time, the reflective layers 590a and 590b allow the transmission of certain frequencies or narrow frequency bands of the light through the reflective layers 590a and 590b and away from the electro-optical CHPW 505. In examples, the optical apparatus 500 can be used as part of an optical switch or an optical multiplexer that is controlled, by the amount of voltage applied to the electro-optical CHPW 505, to modulate the waves at the operation frequencies or frequency bands for the respective optical channels.

Figure 6:
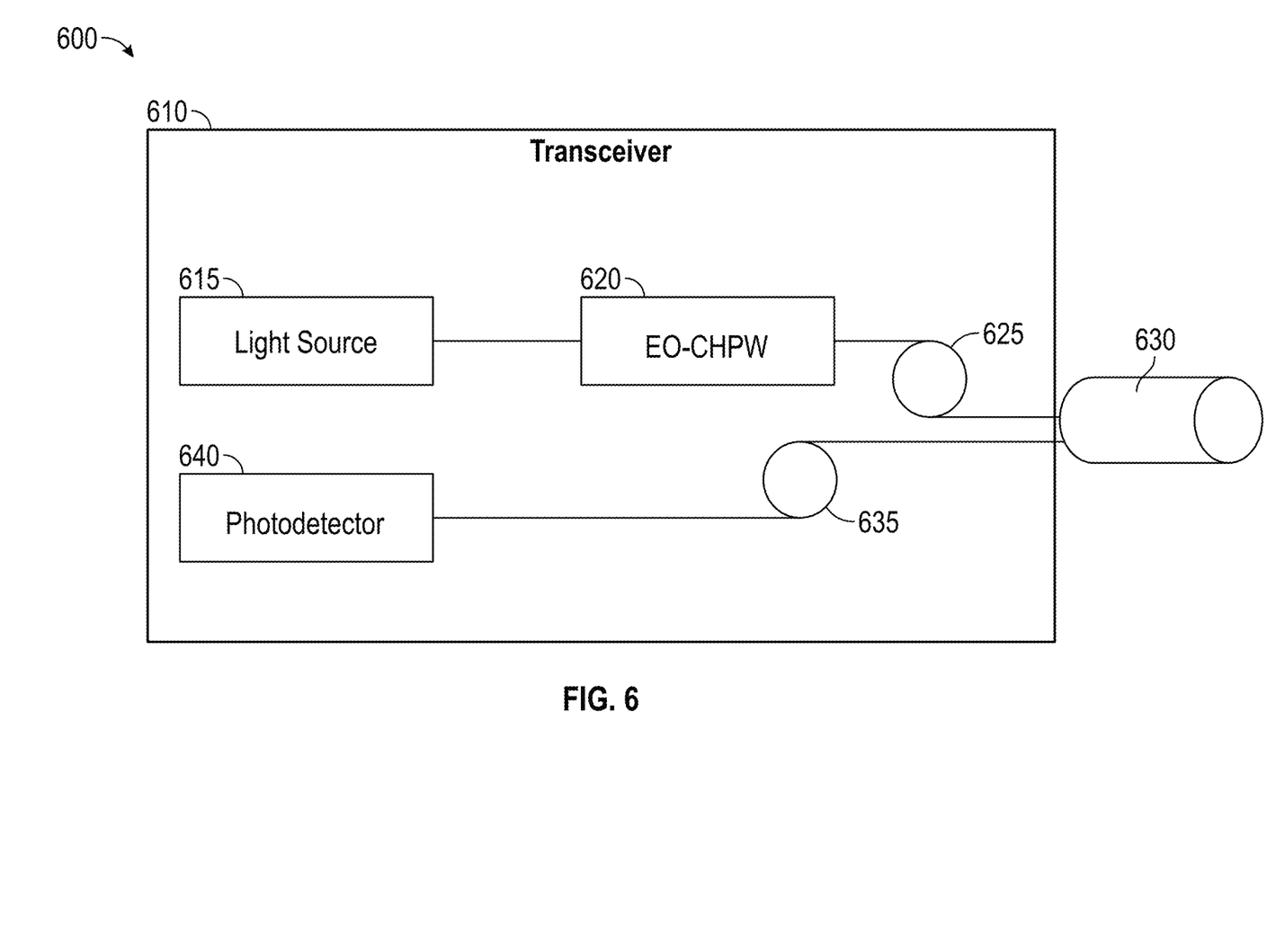
FIG. 6 illustrates an exemplary integrated opto-electronic platform comprising electro-optical CHPWs according to some embodiments.

In some embodiments, the electro-optical CHPWs and corresponding photonic devices described above can be part of integrated opto-electronic platforms (e.g., circuit boards of chips), such as for interconnects. FIG. 6 illustrates an exemplary integrated opto-electronic platform 600 comprising electro-optical CHPWs according to some embodiments. The integrated opto-electronic platform 600 includes a transceiver 610 that can be coupled to an optical link through an optical fiber 630. The transceiver 610 comprises a light source 615 that is coupled to the optical fiber 630 through an electro-optical CHPW (EO-CHPW) 620. The light source 615 can be a light-emitting diode (LED) or a set of LEDs having a wider transmission spectrum output than a single LED. In other embodiments, the light source 615 may include one or more laser devices coupled to the integrated opto-electronic platform 600 by an optical fiber. The EO-CHPW 620 can be controlled by a voltage from a power source (not shown) to modulate the light forwarded from the light source 615 toward the optical fiber 630. The transceiver 610 also comprises a photodetector 640 that is coupled to the same optical fiber 630. The photodetector 640 can be photodiode or a set of photodiodes having a wider detection spectrum than a single photodiode.

As shown in FIG. 6, the components of the transceiver 610 are optically coupled by optical waveguides that form the optical paths in the transceiver 610. In embodiments, the transceiver 610 can also comprise one or more ring resonators to redirect the light waves between the optical paths or optical waveguides. For example, a ring resonator 625 in the transceiver 610 can be optically coupled to the optical fiber 630 and the EO-CHPW 620 through respective waveguides (as shown in FIG. 6). Accordingly, the ring resonator 625 can direct the light waves on a first optical path from the light source 615 to the optical fiber 630. In other embodiments, the ring resonator 625 can be optically coupled directly to the EO-CHPW 620 in a configuration similar to the optical apparatus 400. In another embodiment, a second ring resonator (not shown in FIG. 6) can be optically coupled to the optical fiber 630 and the photodetector 640 through respective waveguides. The second ring resonator can direct the light waves on a second optical path from the optical fiber 630 to the photodetector 640.

In embodiments, the ring resonator 625 can be also be optically coupled to other optical paths or waveguides. For example, the transceiver 610 can comprise a plurality of light sources and a plurality of photodetectors with respective EO-CHPWs on respective optical paths which are optically coupled to the optical fiber 630 by the ring resonator 625. In some embodiments, the EO-CHPW 620 can be disposed into respective optical cavities, for example in a similar configuration of the optical apparatus 500. In another embodiment, the integrated opto-electronic platform 600 can include an optical waveguide instead of the optical fiber 630.

Figure 7:
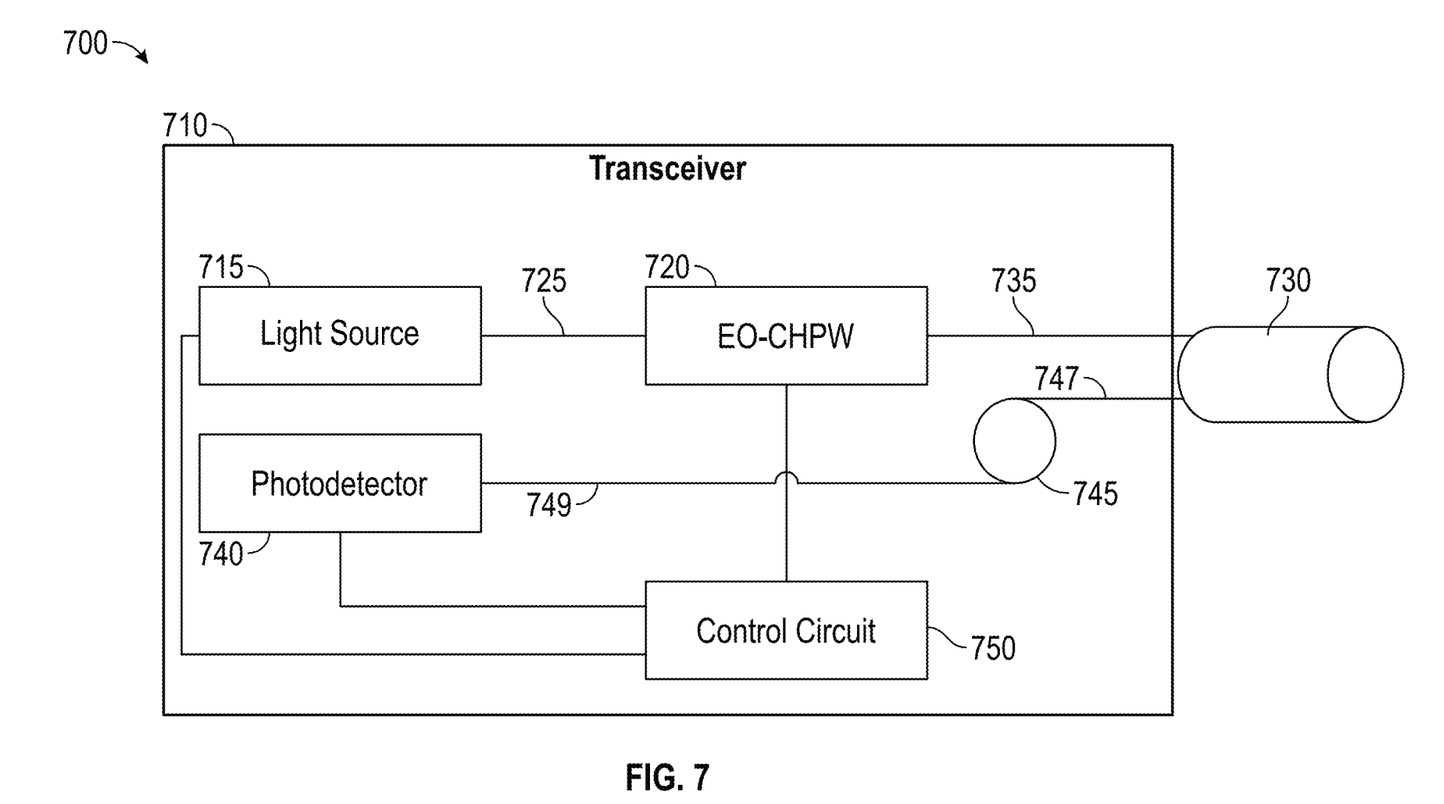
FIG. 7 illustrates another exemplary integrated opto-electronic platform comprising an electro-optical CHPW according to some embodiments.

FIG. 7 illustrates another exemplary integrated opto-electronic platform 700 that includes an EO-CHPW according to some embodiments. The integrated opto-electronic platform 700 includes a transceiver 710 that can be coupled to an optical link through an optical fiber 730. The transceiver 710 comprises a light source 715 and a respective photodetector 740. The light source 715 is optically coupled to the optical fiber 730 through an EO-CHPW 720, which can be controlled by a voltage from a power source to modulate the light that propagates from the light source 715 toward the optical fiber 730. The optical fiber 730 can include one or more optical fibers, optical waveguides, or a combination of both.

The EO-CHPW 720 can be optically coupled to the light source 715 through a first optical waveguide 725 and to the optical fiber 730 through a second optical waveguide 735, on a first optical path of the transceiver 710. The photodetector 740 can be coupled, on a second optical path, to the optical fiber 730 through a third optical waveguide 747, a fourth optical waveguide 749, and a ring resonator 745 for redirecting the light between the third optical waveguide 747 and the fourth optical waveguide 749. The second optical path is for transferring the light from the optical fiber 730 toward the photodetector 740. In another embodiment, the EO-CHPW 720 is coupled directly or via an optical waveguide to a common ring resonator, which is optically coupled to the light source 715 through a respective optical waveguide.

The transceiver 710 further comprises a control circuit 750 that is electrically coupled to the EO-CHPW 720. The control circuit 750 controls and adjusts the voltage to the EO-CHPW 720 to modulate the light waves in the first optical path for the light source 715. The control circuit 750 can also be electrically coupled to the light source 715 and the photodetector 740 and control the operations of the light source 715 and the photodetector 740. In some embodiments, the transceiver 710 includes a plurality of light sources 715 and respective photodetectors 740. The multiple light sources 715 can be coupled to the optical fiber 730 through respective and separate EO-CHPWs 720. Each EO-CHPW 720 can be electrically coupled to the control circuit 750 to adjust a respective voltage for each EO-CHPW 720. In other embodiments, the same EO-CHPW 720 can be coupled to multiple light sources 715.

Figure 8:
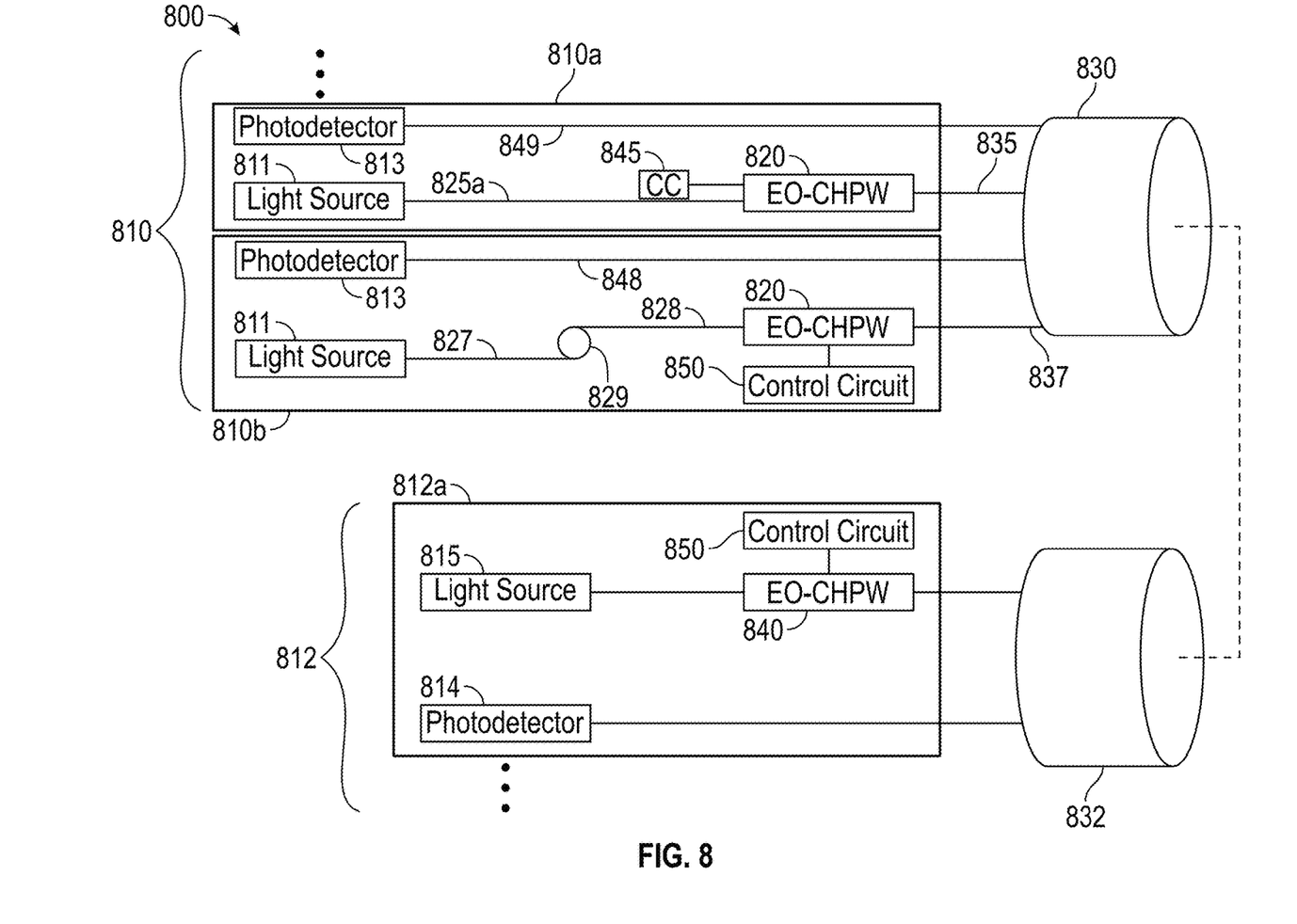
FIG. 8 illustrates another exemplary integrated opto-electronic platform comprising an electro-optical CHPW according to some embodiments.

In some embodiments, multiple transceivers, for example similar to the transceiver 610 or 710, can be coupled to an optical link through respective EO-CHPWs 720. FIG. 8 illustrates integrated opto-electronic platforms 800 comprising an EO-CHPW according to some embodiments. The configuration of the integrated opto-electronic platforms 800 in FIG. 8 connects between multiple transceivers that can correspond to different optical channels and allows the modulation of optical carriers that are transmitted between the different transceivers and platforms.

The integrated opto-electronic platforms 800 includes a plurality of first transceivers 810 that are coupled to a plurality of second transceivers 812 through a common optical link. The optical link can include one or more optical fibers, optical waveguides, or a combination of both. For example, as shown in FIG. 8, the optical link includes a first optical fiber 830 optically coupled to the first transceivers 810 and a second optical fiber 832 optically coupled to the second transceivers 812 and the first optical fiber 830. The first transceivers 810 and second transceivers 812 can include respective light sources and photodetectors, for example in configurations similar to the transceiver 610 or 710. The first transceivers 810 are coupled in parallel to the first optical fiber 830 through respective first EO-CHPWs 820. Each first EO-CHPW 820 is optically coupled to a respective light source 811 in a first transceiver 810 and the first optical fiber 830 via respective waveguides on respective optical paths. As shown in FIG. 8, the first transceivers 810 include photodetectors 813 that are coupled to the first optical fiber 830 through respective waveguides without an EO-CHPW. Any of the light sources 811 or the photodetectors 813 can also be coupled to a respective resonator on a respective optical path.

For example, in a first optical path, a first EO-CHPW 820 is coupled to a light source 811 in the first transceiver 810a via a respective optical waveguide 825, and to the first optical fiber 830 via an optical waveguide 835. The first EO-CHPW 820 can be electrically coupled to a control circuit 845 that controls and adjusts the voltage to the first EO-CHPW 820 to modulate the light waves in the first optical path for the first transceiver 810a. The optical paths for the light sources 811 can also include ring resonators. For example, on a second optical path, a second EO-CHPW 840 is coupled to a respective light source 811 of the first transceiver 810b via the optical waveguides 827/828 and a ring resonator 829, and to the first optical fiber 830 via a an optical waveguide 837.

The second transceivers 812 can also be coupled to respective second EO-CHPWs 840 on respective optical paths to the second optical fiber 832. For example, the second transceiver 812a is coupled on a respective optical path to the second optical fiber 832 through a respective second EO-CHPWs 840 and optical waveguides. The second EO-CHPWs 840 of the second transceiver 812a is also coupled to a respective control circuit 850. The second transceivers 812 also include photodetectors 814 that are coupled to the second optical fiber 832 through respective waveguides without an EO-CHPW.

In other embodiments, aspect of design and components of any of EO-CHPWs, optical apparatuses, transceivers, and integrated opto-electronic platforms described above can be combined in any suitable manner to develop optical devices and systems for communicating optical and electronic signals. The components can be integrated onto a same platform stack or a same platform on different stacks, or can be located on different platforms that are electrically or optically coupled, such as using optical fibers.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

As used herein, the term "plurality" denotes two or more. For example, a plurality of components indicates two or more components.

The phrase "based on" does not mean "based only on," unless expressly specified otherwise. In other words, the phrase "based on" describes both "based only on" and "based at least on."

As used herein, the term "exemplary" means "serving as an example, instance, or illustration," and does not necessarily indicate any preference or superiority of the example over any other configurations or implementations.

As used herein, the term "and/or" encompasses any combination of listed elements. For example, "A, B, and/or C" includes the following sets of elements: A only, B only, C only, A and B without C, A and C without B, B and C without A, and a combination of all three elements, A, B, and C.

The descriptions of the various embodiments of the present disclosure have been presented for purposes of illustration, but are not intended to be exhaustive or limited to the embodiments disclosed. The description of the disclosed embodiments is provided to enable any person skilled in the art to make or use the present disclosure. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the described embodiments. For example, it will be appreciated that one of ordinary skill in the art will be able to employ a number corresponding alternative and equivalent structural details. Thus, the present disclosure is not intended to be limited to the embodiments shown herein but is to be accorded the widest scope consistent with the principles and novel features disclosed herein.

What is claimed is:

1. An optical apparatus, comprising:
   an electromagnetic waveguide, comprising:
     a first set of layers, comprising:
       a first semiconductor layer; and
       an electro-optical material layer;
     a second set of layers, comprising:
       a metal layer adjacent to the electro-optical material layer; and
       a second semiconductor layer on a side of the metal layer opposite from the electro-optical material layer,
   wherein the first semiconductor layer is on a side of the electro-optical material layer opposite from the metal layer,
   wherein the electromagnetic waveguide is configured to create coupled plasmonic modes in the electro-optical material layer, wherein the electro-optical material layer exhibits an electro-optical effect through second-order nonlinearity, and
   wherein the electro-optical material layer is configured to modulate light in the coupled plasmonic modes based on a voltage applied across a thickness of the electro-optical material layer.

2. The optical apparatus of claim 1, wherein the first semiconductor layer is adjacent to the electro-optical material layer, and wherein the second semiconductor layer is adjacent to the metal layer.

3. The optical apparatus of claim 1, wherein the electro-optical material layer is configured to modulate a phase of the coupled plasmonic modes based on the voltage, wherein the phase is shifted by a first phase shift value in response to the voltage being a first voltage value, and wherein the phase is shifted by a second phase shift value in response to the voltage being a second voltage value.

4. The optical apparatus of claim 1, wherein the thickness of the electro-optical material layer is less than a thickness of each of the first semiconductor layer and the second semiconductor layer, and wherein a ratio of a thickness of the metal layer to a wavelength of the light in the coupled plasmonic modes is less than 0.1.

5. The optical apparatus of claim 4, wherein the thickness of the metal layer is less than the thickness of each of the first semiconductor layer and the second semiconductor layer.

6. The optical apparatus of claim 5, wherein the respective thicknesses of the electro-optical material layer and the metal layer are less than a width of the electromagnetic waveguide.

7. The optical apparatus of claim 5, wherein the respective thicknesses of the electro-optical material layer and the metal layer are on an order of tens of nanometers.

8. The optical apparatus of claim 1, wherein the electro-optical material layer comprises a crystalline lattice configured to produce the electro-optical effect, and wherein the electro-optical effect comprises changing a refractive index of the electro-optical material layer in response to the voltage applied across the thickness of the electro-optical material layer.

9. The optical apparatus of claim 1, wherein the metal layer is coupled to a contact configured to apply the voltage across the thickness of the electro-optical material layer.

10. The optical apparatus of claim 9, wherein the electromagnetic waveguide further comprises a second metal layer in contact with the first semiconductor layer, wherein the second metal layer is coupled to a second contact configured to apply the voltage across the thickness of the electro-optical material layer.

11. The optical apparatus of claim 1, wherein a refractive index of the first semiconductor layer is greater than a refractive index of the electro-optical material layer.

12. The optical apparatus of claim 1, wherein the second set of layers comprises a third semiconductor layer on the second semiconductor layer, wherein a refractive index of the second semiconductor layer is less than a refractive index of the third semiconductor layer.

13. The optical apparatus of claim 1, wherein the second set of layers comprises a second electro-optical material layer in contact with the metal layer, wherein first electro-optical material layer and the second electro-optical material layer are in contact with the metal layer on respective sides and surfaces of the metal layer.

14. The optical apparatus of claim 1, wherein the electro-optical material layer comprises lithium niobate ($LiNbO_3$), and wherein at least one of the first semiconductor layer and the second semiconductor layer comprises silicon (Si) or doped silicon oxide ($SiO_2$).

15. The optical apparatus of claim 1, further comprising a resonant element optically coupled to the electro-optical material layer, and wherein the resonant element is either a) a ring resonator that is adjacent to the electro-optical material layer, or b) an optical cavity, the electro-optical material layer being disposed within the optical cavity.

16. A transceiver device, comprising:
    an electro-optical coupled hybrid plasmonic waveguide (CHPW), comprising:
      an electro-optical material layer;
      a first semiconductor layer adjacent to a first surface of the electro-optical material layer;
      a metal layer adjacent to a second surface of the electro-optical material layer; and
      a second semiconductor layer adjacent to an opposite side of the metal layer than the electro-optical material layer, wherein the electro-optical material layer exhibits an electro-optical effect through second-order nonlinearity, wherein the electro-optical CHPW is configured to transfer light, wherein the electro-optical CHPW is configured to create coupled plasmonic modes in the electro-optical material layer, and wherein the electro-optical material layer is configured to modulate light in the coupled plasmonic modes based on a voltage applied across a thickness of the electro-optical material layer.

17. The transceiver device of claim 16, further comprising one or more light sources optically coupled to the electro-optical CHPW, wherein the electro-optical CHPW is optically coupled to one or more optical paths of the light sources and the electro-optical CHPW is a transmitter modulator.

18. The transceiver device of claim 16, further comprising a control circuit coupled to the electro-optical CHPW, wherein the control circuit is configured to control a voltage applied across a thickness of the electro-optical material layer.

19. The transceiver device of claim 16, further comprising one or more photodetectors, wherein the electro-optical CHPW is optically coupled to one or more optical paths of the one or more photodetectors.

20. The transceiver device of claim 19, further comprising one or more waveguides or optical fibers coupled to the electro-optical CHPW and respectively to the one or more photodetectors.

\* \* \* \* \*